(12) United States Patent
Monajemi et al.

(10) Patent No.: US 12,439,437 B2
(45) Date of Patent: Oct. 7, 2025

(54) APPLICATION-BASED TRANSMISSION OPPORTUNITY SHARING

(71) Applicant: Cisco Technology, Inc., San Jose, CA (US)

(72) Inventors: Pooya Monajemi, San Jose, CA (US); John Matthew Swartz, Lithia, FL (US); Yeneneh Elfaged Gobena, Cary, NC (US); Ian Hasund, Cary, NC (US)

(73) Assignee: Cisco Technology, Inc.

( * ) Notice: Subject to any disclaimer, the term of this patent is extended or adjusted under 35 U.S.C. 154(b) by 343 days.

(21) Appl. No.: 17/165,335

(22) Filed: Feb. 2, 2021

(65) Prior Publication Data

US 2022/0248423 A1 Aug. 4, 2022

(51) Int. Cl.
*H04W 72/52* (2023.01)
*H04W 74/04* (2009.01)

(52) U.S. Cl.
CPC .......... *H04W 72/52* (2023.01); *H04W 74/04* (2013.01)

(58) Field of Classification Search
None
See application file for complete search history.

(56) References Cited

U.S. PATENT DOCUMENTS

| | | | |
|---|---|---|---|
| 2013/0287043 A1 | 10/2013 | Nanda et al. | |
| 2015/0350974 A1* | 12/2015 | Patil | H04W 36/0085 370/331 |
| 2015/0359008 A1* | 12/2015 | Wang | H04W 74/004 370/330 |
| 2016/0212768 A1* | 7/2016 | Wentink | H04W 16/14 |
| 2018/0213566 A1* | 7/2018 | Baron | H04W 72/569 |
| 2018/0255571 A1* | 9/2018 | Irie | H04W 72/23 |
| 2020/0008169 A1* | 1/2020 | Henry | H04W 36/00835 |
| 2020/0077350 A1 | 3/2020 | Gidvani et al. | |
| 2020/0367283 A1 | 11/2020 | Cariou et al. | |
| 2021/0136679 A1* | 5/2021 | Verma | H04W 72/23 |
| 2022/0070772 A1* | 3/2022 | Ho | H04W 74/006 |
| 2023/0107240 A1* | 4/2023 | Sundman | H04B 7/0697 370/329 |

(Continued)

FOREIGN PATENT DOCUMENTS

WO  WO-2022130216 A1 * 6/2022 .......... H04W 74/006

OTHER PUBLICATIONS

Lochan Verma et al., Coordinated AP Time/Frequency Sharing in a Transmit Opportunity in 11be, IEEE Nov. 2019 802.11-19/1582r2, Nov. 2019, 15 pages.

(Continued)

*Primary Examiner* — Derrick W Ferris
*Assistant Examiner* — Keith Follansbee
(74) *Attorney, Agent, or Firm* — Merchant & Gould P.C.

(57) ABSTRACT

Application-based Transmission Opportunity (TXOP) sharing may be provided. First, a sharing AP may receive a request to share TXOPs with a requesting AP. The request may include information associated with an application executing on a client serviced by the requesting AP. Next, a TXOP duration for the requesting AP may be reserved based on the information associated with the application such that, in response to winning contention on the medium, the sharing AP may share a TXOP with the requesting AP for the TXOP duration.

20 Claims, 5 Drawing Sheets

(56) References Cited

U.S. PATENT DOCUMENTS

2023/0319866 A1* 10/2023 Sedin .................. H04W 16/10
 370/329

OTHER PUBLICATIONS

Laurent Cariou et al., C-TDMA definition, 20/0574r0, TGbe Teleconference submission, Apr. 2020, 5 pages.
Charlie Pettersson et al., Hidden Node Protection in Coordinated AP Transmissions, IEEE 802.11-20/0933r0, May 2020, 8 pages.
Ming Li et al., Resource Management in IEEE 802.11 Based Wireless Networks, Handbook of Research on Wireless Multimedia: Quality of Service and Solutions, DOI: 10.4018/978-1-59904-820-8.ch004, Jan. 2008, 29 pages.
David Lopez-Perez et al., IEEE 802.11be—Extremely High Throughput: The Next Generation of Wi-Fi Technology Beyond 802.11ax, arXiv: 1902.04320v1 [cs.IT] Feb. 12, 2019, 8 pages.

* cited by examiner

APPLICATION-BASED TRANSMISSION OPPORTUNITY SHARING

TECHNICAL FIELD

The present disclosure relates generally to announcing and leveraging information associated with high priority applications currently executing in a wireless network to create a supply for Transmission Opportunity (TXOP) sharing in the wireless network.

BACKGROUND

In computer networking, a wireless Access Point (AP) is a networking hardware device that allows a Wi-Fi compatible client to connect to a wired network and to other clients. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

An AP connects to a wired network, then provides Radio Frequency (RF) links (e.g., channels) for other radio devices, such as clients associated with that AP, to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
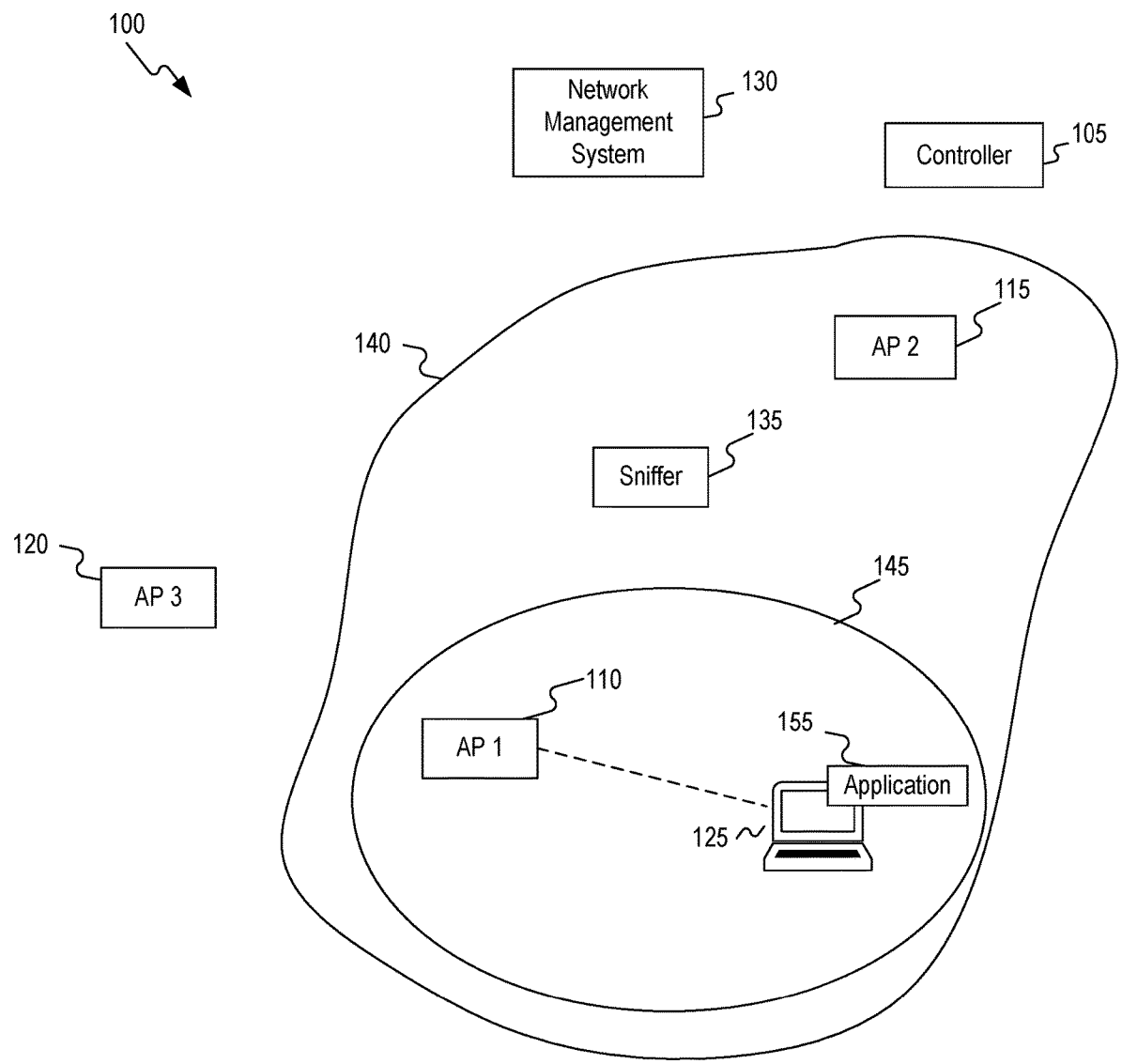
FIG. 1 is a block diagram of wireless network.

Application-based Transmission Opportunity (TXOP) sharing may be provided. First, a sharing AP may receive a request to share TXOPs with a requesting AP. The request may include information associated with an application executing on a client serviced by the requesting AP. Next, a TXOP duration for the requesting AP may be reserved based on the information associated with the application such that, in response to winning contention on the medium, the sharing AP may share a TXOP with the requesting AP for the TXOP duration.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Institute of Electrical and Electronics Engineers (IEEE) 802.11be, also referred to as Wi-Fi 7, introduces a set of features classified under the main category of "Access Point (AP) Coordination" that enable a number of APs in a neighborhood to coordinate their transmissions. A subset of these features includes schemes for nearby APs in the neighborhood to share Transmission Opportunities (TXOPs) among each other. For example, once an AP wins contention for a medium, it may choose to announce that parts of the TXOP are available for networks of the neighboring APs (e.g., neighboring Basic Service Sets (BSSs)) to use for their clients. The sharing may be done in a time domain or in a frequency domain. For example, if the sharing is done in the time domain, the AP that wins the contention may use 2 milliseconds (ms) and provide 3 ms to a neighboring AP. As another example, if the sharing is done in the frequency domain, and an AP wins contention on a 80 Megahertz (MHz) channel, the AP may use 20 MHz, then provide 40 mHz to a first neighboring AP and remaining 20 MHz to a second neighboring AP.

Currently, the schemes include mechanisms for the AP that wins the contention to announce the availability of the TXOP, and for the neighboring APs to announce their interest in using resources in this TXOP. In other words, the schemes are limited to the contention-winning AP announcing the supply of TXOP in order to create demand among the neighboring APs (e.g., a supply-driven mechanism). Additionally, APs currently contend for the medium based on their associated traffic, which leads to missed opportunities for TXOP sharing that help reduce latency and improve performance of a network. For example, although a first AP may have low priority traffic, if a second AP nearby the first AP has high priority traffic it may be advantageous for the first AP to nonetheless contend more aggressively to win the medium because it can share a TXOP with second AP. Further, the APs do not have any prior knowledge about the needs of neighboring APs (e.g., no knowledge of applications running on clients serviced by those APs and resources required by those applications). Therefore, the contention-winning AP may blindly reserve only a fraction of TXOP duration that is actually needed to be shared with one or more of its neighboring APs.

Embodiments described herein overcome these above-described deficiencies of the current TXOP sharing schemes by creating a demand-driven TXOP sharing marketplace through the announcement and leverage of information associated with applications currently running on neighboring BSS. For example, when an AP within the coordinated AP set detects a client running a high priority application, such as a video conferencing application, the AP (e.g., a requesting AP) may announce this information to the neighborhood and request TXOP assistance. The announcement may be shared with at least a subset of the neighboring APs and may include the following information associated with the high priority application: traffic Access Category (AC), traffic load, traffic periodicity, and latency sensitivity of the high priority application. This announcement (e.g., an indication of demand) that is shared across the neighboring APs triggers the creation of a supply within the TXOP sharing marketplace. For example, the neighboring APs that receive the request (e.g., sharing APs) may utilize this announcement information to contend more aggressively for the medium based on the high priority application traffic and may reserve a TXOP duration to meet air time requirements of the application. This increases the probability that either the requesting AP or one of the sharing APs may win contention of the medium such that the requesting AP may service the client executing the high priority application over the medium if it wins the contention or using a shared TXOP of a sufficient TXOP duration from one of the sharing APs that wins the contention.

FIG. 1 shows a block diagram of wireless network 100. As shown in FIG. 1, network 100 may be a WLAN comprising a controller 105 and a plurality of APs, such as first AP 110, second AP 115, and third AP 120. Controller 105 may be a WLAN controller that manages and configures the APs of network 100. The APs may be networking hardware devices that enables other devices, such as client 125, to connect to network 100. For illustrative clarity, a single client (e.g., client 125) is shown. However, network 100 may comprise a plurality of clients. These clients, including client 125, may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

In some examples, there may be a common management entity, such as a network management system 130, managing or coordinating at least a subset of network 100. For example, network management system 130 may facilitate TXOP sharing between one or more sets of coordinated APs, such as first AP 110 and second AP 115. Network management system 130 may also manage other devices of network 100, such as a sniffer 135, a sensor, or other similar auxiliary device, to collect proximity based information used for a TXOP sharing determination (e.g., a determination of whether a particular AP can share their TXOP with a requesting AP based on the particular AP's proximity to the client being serviced via the TXOP). As one example, second AP 115 may be determined to be within a predefined proximity 140 to client 125 and thus second AP 115 may be enabled to share a TXOP with first AP 110 for use in servicing client 125. One non-limiting example of network management system 130 is the Cisco® Digital Network Architecture Center (DNA-C).

Client 125 may be associated with first AP 110 to connect to network 100, where first AP 110, client 125, and any other clients associated with first AP 110 may form a first Basic Service Set (BSS) 145. As illustrated, client 125 may be executing an application 155. Application 155 may be a high priority application, such as a latency-sensitive application. One exemplary latency-sensitive application may be a video conferencing application. Although only one client and one application executing thereon is shown for illustrative purposes, first AP 110 may be servicing more than one client, where each client may be executing one or more high priority applications.

Each of the APs (e.g., first AP 110, second AP 115, and third AP 120) may be competing with clients of network 100 to gain medium access (e.g., to win channel contention) in order to transmit data over the medium. IEEE standards define contention rules, also referred to as back-off rules or Enhanced Distributed Channel Access (EDCA) rules, for gaining access to the medium, whereby an AP or client must first listen on a channel for a period of time to determine whether any other AP or client is transmitting before the AP or client may win contention on that channel and subsequently transmit data on that channel.

EDCA parameters for a respective AP or client may indicate how long it has to listen/wait before it can win contention and thus transmit on the channel. EDCA parameters may be based on an AC of traffic to be transmitted and an associated priority of the AC. ACs may include voice, video, best effort, and background, where voice may be the highest priority followed by video, best effort, and background, respectively. For example, if an AP is servicing a client with high priority traffic, that AP and/or client needs access to the channel more quickly than another client that only has some background traffic that is less time-sensitive and thus can wait longer to access the channel. Resultantly, APs or clients associated with higher priority traffic to be transmitted may have EDCA parameters indicating shorter listen/wait periods, while APs or clients associated with lower priority traffic to be transmitted may have EDCA parameters indicating longer listen/wait periods. For example, a random number may be generated with a distribution defined by EDCA parameters for a respective AP or client. The respective AP or client must then wait for a period of time equal to that random number generated before being able to win contention and transmit on the channel. During that wait period, AP or client is listening on the channel to see if another AP or client transmits on the channel or not.

Conventionally, APs and clients contend for access to the channel based on EDCA parameters derived from their own traffic because they are generally unaware of the traffic of others in network 100. For example, if second AP 115 is servicing a client with low priority traffic, conventionally, EDCA parameters for second AP 115 may only be based on that low priority traffic and thus second AP 115 would not contend very aggressively to win the channel. Additionally, because APs are unaware of the traffic of others in network 100, when an AP that wins contention shares a TXOP with another AP, the AP reserves or pre-allocates a TXOP duration for the other AP blindly without any knowledge of air time requirements needed by the other AP to sufficiently service an associated client. For example, in a scenario where second AP 115 wins contention and shares a TXOP with first AP 110, conventionally, the second AP 115 would reserve a duration blindly that does not account for the traffic load requirements, periodicity and/or latency sensitivity of application 155 executing on client 125 that first AP 110 is using the shared TXOP to service. Thus, it is often common that the TXOP duration reserved is not adequate for first AP 110 to sufficiently service client 125 leading to latency and corresponding poor performance of application 155.

However, if second AP 115 is able to become aware of a neighboring AP that is servicing a client with high priority traffic, such as first AP 110 servicing client 125 that is executing application 155, it may be advantageous for second AP 115 to more aggressively contend for the channel to increase the probability that either first AP 110 or second AP 115 wins contention. This ensures that client 125 with the high priority traffic may be provided quicker access to the channel either by first AP 110 if first AP 110 wins contention or through a part of a TXOP shared by second AP 115 to first AP 110 if second AP 115 wins contention, where first AP 110 uses the shared TXOP to service client 125. Additionally, if second AP 115 wins contention, it can use its gained knowledge of the application 155 to more purposefully reserve the TXOP duration for the TXOP shared with first AP 110 to meet air time requirements of application 155 leading to lower latency and better performance of application 155.

Embodiments as described herein provide a mechanism for creating a demand-driven TXOP sharing marketplace through the announcement and leverage of information associated with applications currently running on neighboring BSS, including their traffic ACs and predictable air time requirements based on traffic load and periodicity, as well as latency sensitivity. For example, and as described in greater detail below, upon first AP 110 detecting application 155 running on client 125, first AP 110 and/or network management system 130 may share an announcement across neighboring APs, including second AP 115, that first AP 110 needs TXOP assistance. This announcement (e.g., an indication of demand) that is shared across the neighboring APs triggers the creation of a supply within the TXOP sharing marketplace. For example, the announcement may include a traffic AC, traffic load, traffic periodicity, and/or latency sensitivity associated with application 155 that can be leveraged by the neighboring APs when contending for access to the medium and, if contention is won by one of the neighboring APs, to reserve a TXOP duration for first AP 110.

The elements described above of network 100 (e.g., controller 105, first AP 110, second AP 115, and third AP 120, network management system 130, and sniffer 135) may be practiced in hardware and/or in software (including firmware, resident software, micro-code, etc.) or in any other circuits or systems. The elements of network 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of network 100 may also be practiced using other technologies capable of performing logical operations such as, for example, AND, OR, and NOT, including but not limited to, mechanical, optical, fluidic, and quantum technologies. As described in detail below with respect to FIG. 5, the elements of network 100 may be practiced in a computing device 500.

Figure 2:
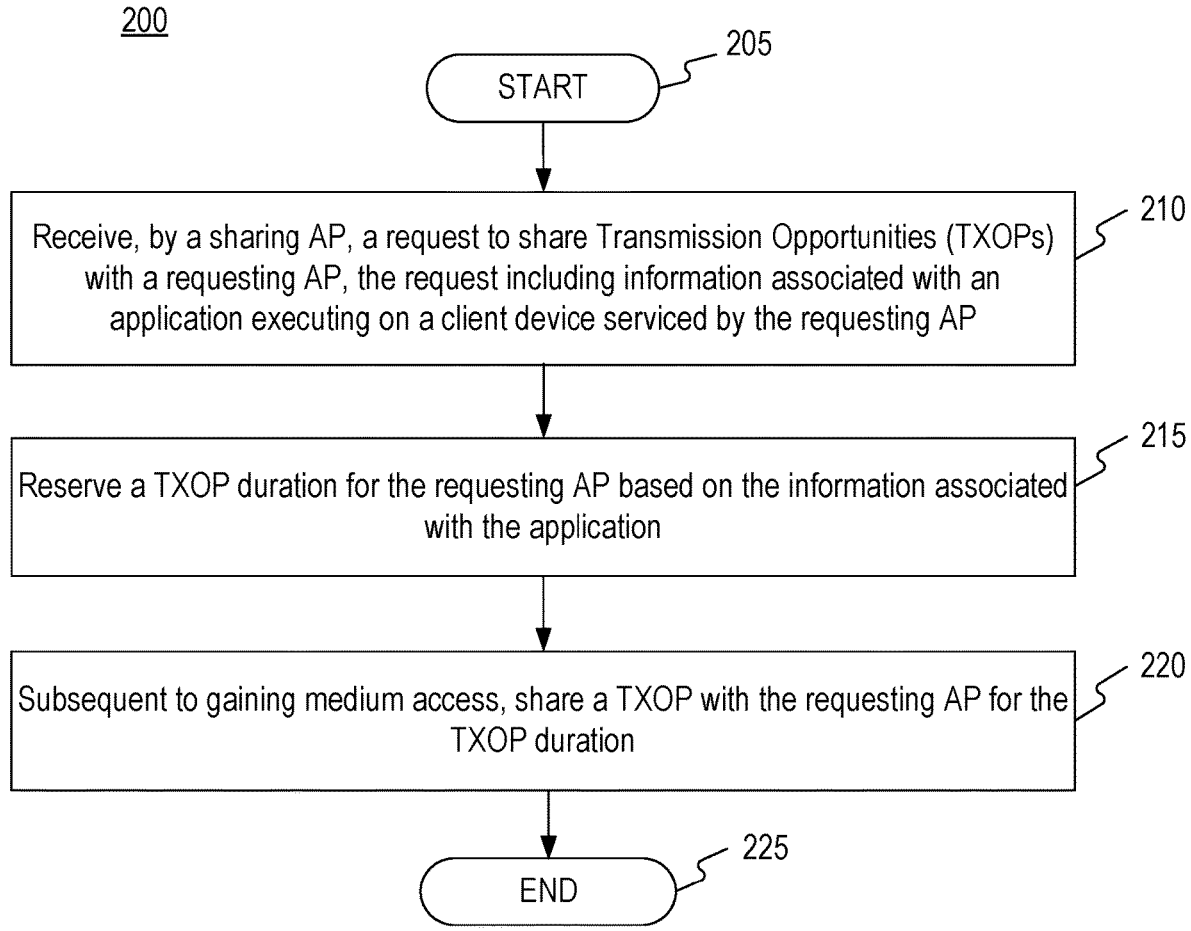
FIG. 2 is a flow chart of a method for providing application-based TXOP sharing.

FIG. 2 is a flow chart setting forth the general stages involved in a method 200 consistent with embodiments of the disclosure for providing application-based TXOP sharing. Method 200 may be implemented using computing device 500 (e.g., a sharing AP such as second AP 115) as described in more detail below with respect to FIG. 5. Ways to implement the stages of method 200 will be described in detail below.

Method 200 may begin at starting block 205 and proceed to stage 210, where a request to share TXOPs with a requesting AP, such as first AP 110, is received at a sharing AP, such as second AP 115. The request may be received subsequent to first AP 110 detecting application 155 executing on client 125 that is being serviced by first AP 110. In some examples, the request may be received over a wired connection or wireless connection (e.g., over the air) from first AP 110. In some examples, if received over the air, the request may be received within a vendor-specific frame. In other examples, the request may be received from network management system 130.

As described in greater detail below with reference to FIG. 3, second AP 115 may be one of a subset of neighbor APs to first AP 110 that is determined to be within predefined proximity 140 to client 125. Alternatively, if proximity information is not available, second AP 115 may be a neighbor AP that is not identified as having a pattern of shared TXOP failures (e.g., not having a number of shared TXOP failures greater than a predefined number). In some examples, the request may be transmitted to one or more other neighbor APs within the subset of neighbors AP or to each neighbor AP if no proximity information is available. The request indicates that first AP 110 may be in need of TXOP assistance (e.g., proactively indicates demand for TXOP) in order to create a TXOP supply in network 100. In addition to or included within the request, information associated with the application 155 may be received. For example, the information may include traffic AC, traffic load, traffic periodicity and/or latency sensitivity. This information may be leveraged by the sharing AP, such as second AP 115, to reserve a TXOP duration for the requesting AP as well as enable the sharing AP to contend more aggressively for the medium, as described in detail below.

Once the request is received at stage 210, method 200 may proceed to stage 215, where sharing AP may reserve a TXOP duration for the requesting AP based on the information associated with the application. For example, second AP 115 may use the information associated with application 155, such as traffic load, to reserve or pre-allocate an appropriate amount of air time that first AP 110 will need for data transmission to service client 125 using a shared TXOP. In some examples, TXOP duration may be a time value (e.g., in ms) if the TXOP sharing is being performed in a time domain. For example, 3 ms may be pre-allocated as the TXOP duration for the shared TXOP with first AP 110. In other examples, TXOP duration may be a channel bandwidth (e.g., in MHz) if the TXOP sharing is being performed in the frequency domain. For example, 40 mHz may be pre-allocated as the TXOP duration for the shared TXOP with first AP 110. In further examples, TXOP duration may include a combination of a time value and a channel bandwidth if the TXOP sharing is being performed in both time and frequency domains.

Method 200 may then proceed to the stage 220, where subsequent to the sharing AP, such as second AP 115, gaining medium access, a TXOP may be shared with the requesting AP, such as first AP 110, for the TXOP duration. The sharing AP may gain medium access by winning the medium during contention.

In some examples, and as described in more detail with respect to FIG. 4 below, the information associated with the application that is received as part of or in addition to the request to share TXOPs, may be leveraged to enable sharing APs, such as second AP 115, to contend more aggressively for medium access. This increases a probability that either first AP 110 or one of the sharing APs will win the medium during contention to ensure that client 125 will be timely serviced to reduce latency and thus improve quality of service for application 155 executing on client 125. For example, client 125 executing application 155 may use air time for transmitting data on the medium if either first AP gains medium access and services client 125 or if one of the sharing APs gains medium access and shares a TXOP with first AP 110, which first AP 110 then uses to service client 125.

For example, EDCA parameters for the sharing AP, such as second AP 115, may be modified according to a priority of the application, such as application 155. As one example, initially EDCA parameters for second AP 115 may be based on a traffic AC of second AP 115. Thus, if second AP 115 has low priority traffic corresponding to background or best effort ACs, for example, then initially EDCA parameters for second AP 115 may be a first set of EDCA parameters assigned to those background or best effort ACs. These first set of EDCA parameters may generally indicate that second AP 115 and/or clients being serviced by second AP 115 can wait longer to gain access the medium making it less likely for second AP 115 to win contention. Thus, to enable second AP 115 to more aggressively contend for medium access, the first set of EDCA parameters may be modified to a second set of EDCA parameters that are assigned to the traffic AC of application 155. The traffic AC of application 155 may be obtained from the information provided along with the request. As one example, the traffic AC of application 155 may be higher priority ACs such as voice or video. This second set of EDCA parameters may generally indicate that second AP 115 and/or clients being serviced by second AP 115 need to gain access more quickly to the medium making it more likely for second AP 115 to win contention.

Once the sharing AP shares the TXOP with the requesting AP at stage 220, the requesting AP may use the TXOP to service the client for the TXOP duration. For example, first AP 110 may use the TXOP shared from second AP 115 to service client 125 executing application 155 for the TXOP duration which was reserved or pre-allocated based on knowledge of requirements (e.g., air time requirements) of application 155.

Method 200 may then end at stage 225.

As described in greater detail with reference to FIG. 4, in some example scenarios, in response to determining that a shared TXOP with the requesting AP would be wasteful (e.g., is not needed based on a recency of a last TXOP used by the requesting AP), sharing AP may not modify EDCA parameters and/or reserve the TXOP duration. Instead, sharing AP may contend as normal for medium access using the first set of EDCA parameters assigned to AC traffic of the sharing AP itself and, if the sharing AP wins contention, the sharing AP would not share a TXOP with the requesting AP.

Figure 3:
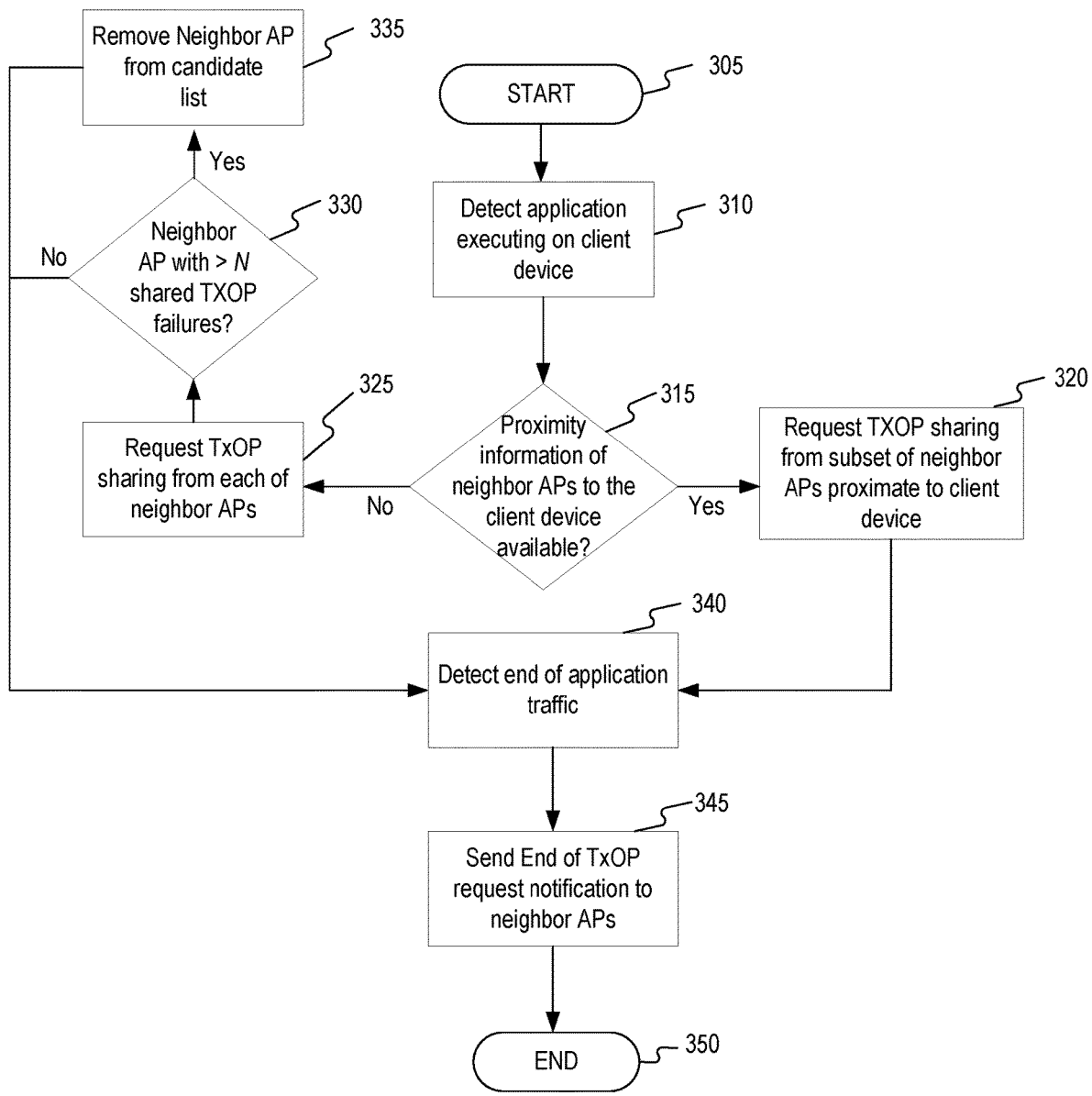
FIG. 3 is a flow diagram depicting a method for requesting TXOP sharing.

FIG. 3 is a flow diagram setting forth the general stages involved in a method 300 consistent with embodiments of the disclosure for requesting TXOP sharing. Method 300 may be implemented using computing device 500 (e.g., a requesting AP such as first AP 110 and/or network management system 130) as described in more detail below with respect to FIG. 5. Ways to implement the stages of method 300 will be described in greater detail below.

Method 300 may begin at starting block 305 and proceed to stage 310, where an application executing on a client associated with an AP (e.g., a requesting AP) is detected. The application may be a high priority application associated with high priority traffic, such as voice and/or video. For example, application 155 executing on client 125 associated with first AP 110 may be detected.

In some examples, the requesting AP itself may automatically detect the high priority application from the data traffic stream received from client 125 based on a configuration of the application that corresponds to IEEE standards. For example, for applications that adhere to standardizations, specific markings or identifiers may be used to classify the data traffic (e.g., Differentiated Services Code Point (DSCP) AF-41 for marking a video call). The requesting AP may recognize these markings or identifiers within the data traffic stream and use them to classify the data as high or low priority. In other examples, when the application is a custom application that does not adhere to standardizations, a system that is provisioning the requesting AP, such as network management system 130, may perform the classification and detect the high priority application.

Once the high priority application executing on the client associated with the requesting AP is detected at stage 310, method 300 may proceed to stage 315 where a decision is made as to whether proximity information of neighbor APs to the client is available. In some examples, the decision may further include whether the proximity information, if available, meets at least a threshold confidence level. The proximity information may be gathered from a variety of sources. For example, the proximity information can be obtained from beacon reports generated by the client, recent probe requests, and/or a sniffer, such as sniffer 135.

In some examples, when the proximity information is available, a TXOP sharing candidate list for the client may be generated based on the proximity information. The list may be comprised of a subset of the neighbor APs to requesting AP that have also been determined to be proximate to the client based on the proximity information. As one example, second AP 115 may be one of the subset of neighbor APs to first AP 110 that is also determined to be proximate to client 125 (e.g., within predefined proximity 140). The candidate list may be a dynamically updated list. In some examples, the candidate list may be updated per TXOP or per traffic periodicity for the application.

When known, the proximity of a neighbor AP to the client may be at least one factor in determining to transmit a request for TXOP sharing to that neighbor AP. For example, neighbor APs with a closer proximity to the client may be selected to receive the TXOP sharing request, because if one of those neighbor APs wins contention of the medium and shares a TXOP with the requesting AP, by being closer to the client, other APs and clients in the vicinity may quiet down (e.g., do not transmit) which prevents service interruptions.

To provide an illustrative example, both second AP 115 and third AP 120 may be neighbor APs to first AP 110. However, only second AP 115 may be included within the subset of neighbor APs comprising the candidate list because second AP 115 is also proximate to client 125 (e.g., within predefined proximity 140). Therefore, if second AP 115 wins contention of the medium and shares a TXOP with first AP 110, clients near second AP 115 may hear that second AP 115 won contention and thus defer transmission while service is being provided from first AP 110 to client 125 via TXOP sharing from second AP 115. On the other hand, third AP 120 is not included within the candidate list due to its lack of proximity to client 125 (e.g., third AP 120 is not within predefined proximity 140). If third AP 120, instead of second AP 115, won contention of medium and shared a TXOP with first AP 110, it is likely that clients near second AP 115 may continue to transmit because they are not able to hear that third AP 120 won contention. This continued transmission would interrupt service being provided from first AP 110 to client 125 via TXOP sharing from third AP 120.

If at stage 315, a decision is made that the proximity information of the neighbor APs to the client is available, then method 300 may proceed to stage 320, where TXOP sharing may be requested from a subset of the neighbor APs proximate to the client (e.g., the subset of neighbor APs in the TXOP sharing candidate list for the client). In some examples, information associated with the high priority application, such as an AC of the application's data traffic, load requirements of the application's data traffic, periodicity of the application's data traffic, and/or as latency sensitivity of the application may be provided along with the request.

If at stage 315, a decision is made that the proximity information of the neighbor APs to the client is not available, then method 300 may proceed to stage 325 where TXOP sharing may be requested from each of the neighbor APs to the requesting AP. As previously discussed, information associated with the high priority application, such as an AC of the application's data traffic, load requirements of the application's data traffic, periodicity of the application's data traffic, and/or as latency sensitivity of the application may be provided along with the request. Each of the neighbor APs receiving the request may initially be included within a TXOP sharing candidate list for the client.

Once TXOP sharing may be requested from a neighbor AP of the requesting AP at stage 325, method 300 may proceed to stage 330 where a decision is made as to whether that neighbor AP has a number of shared TXOP failures greater than a predefined number (N). In some examples, failures may be identified based on a lack of acknowledgement of data communicated. In other examples, failures may be identified when another AP or client is detected transmitting over the channel when the requesting AP is attempting to access the channel using the shared TXOP.

If at stage 330, a decision is made that a neighbor AP has a number of shared TXOP failures greater than N, then method 300 proceeds to stage 335 where the neighbor AP is removed from the TXOP sharing candidate list. For example, TXOP sharing may be requested from both second AP 115 and third AP 120. However, it may be decided at stage 330 that third AP 120 has a number of shared TXOP failures greater than N, and third AP 120 is thus removed from the TXOP sharing candidate list at stage 335. In some examples, another AP may be added to the TXOP sharing candidate list upon removal of an AP, such as third AP 120. Otherwise, if at stage 330, a decision is made that the neighbor AP has a number of shared TXOP failures less than N, then the neighbor AP may remain on the TXOP sharing candidate list. Stages 325, 330, and optionally 335 (e.g., dependent on the decision made at stage 330) of method 300 may be performed on each of the neighbor APs concurrently.

Method 300 may then proceed to stage 340. For example, following the transmission of the requests for TXOP sharing to the subset of neighbor APs proximate to the client at stage 320 or to each of the neighbor APs at stage 325, an end of traffic associated with the high priority application executing on the client may be detected at stage 340. In response to this detection, method 300 may proceed to stage 345 where a notification may be transmitted to the neighbor APs to indicate that requesting AP no longer requests TXOP sharing (e.g., an end of TXOP request notification). In some examples, a notification may be transmitted to each neighbor AP that initially received a request.

Method 300 may then end at stage 350.

Figure 4:
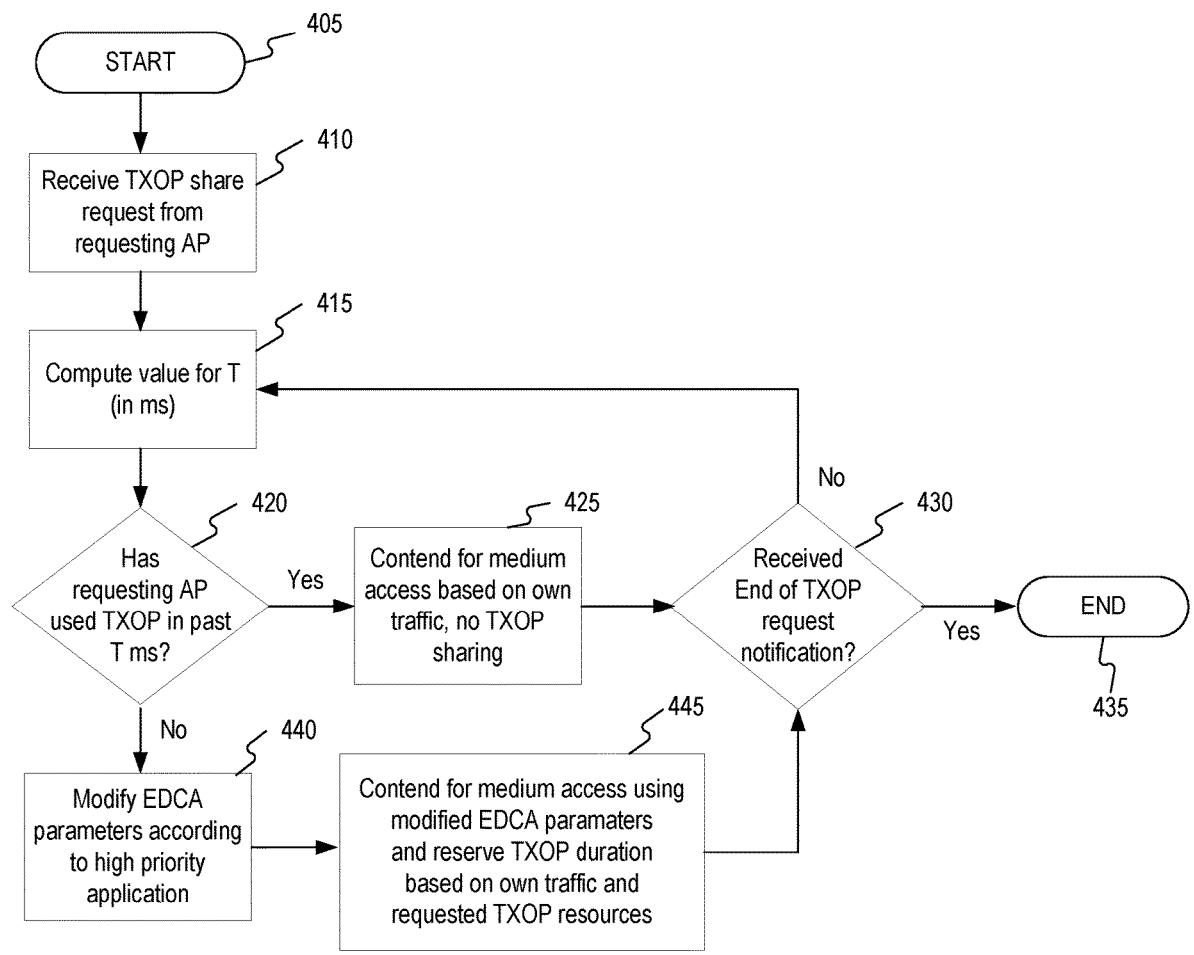
FIG. 4 is a flow diagram depicting a method for responding to a TXOP sharing request.

FIG. 4 is a flow diagram setting forth the general stages involved in a method 400 consistent with embodiments of the disclosure for responding to a TXOP sharing request. Method 400 may be implemented using computing device 500 (e.g., a sharing AP such as second AP 115) as described in more detail below with respect to FIG. 5. Ways to implement the stages of method 400 will be described in greater detail below.

Method 400 may begin at starting block 405 and proceed to stage 410, where a TXOP share request from a requesting AP may be received. The request may be received in response to detection of a high priority application executing on a client serviced by the requesting AP. The TXOP share request indicates there is a demand for TXOP sharing in the network (e.g., to trigger creation of supply) and may also include information associated with the high priority application that can be leveraged to enhance TXOP sharing. The information may include traffic information, such as an AC of the application's traffic, load requirements for the application's traffic, and the application's traffic periodicity, as well as a latency sensitivity of the application. In some examples, the TXOP share request may be received as an announcement from network management system 130.

Upon receipt of the request at stage 410, method 400 may proceed to stage 415 where a time period value (T) is computed. In some examples, T may be based on the application's traffic periodicity, which is indicative of a required service frequency. As one example, application 155 executing on client 125 may need to be serviced by first AP 110 every 20 ms, and thus T may be computed as 20 ms. The application's traffic periodicity may be obtained from the information associated with the high priority application provided along with the request. In other examples, the application's traffic may not be periodic in nature. In such examples, T may be a random value selected based on EDCA rules associated with the high priority application's traffic to effectively create another (e.g., a virtual) contention between the requesting AP's traffic and the sharing AP's traffic on the channel when the sharing AP wins contention.

Subsequent to the computation of the value for T at stage 415, method 400 may proceed to stage 420 where a decision is made as to whether the requesting AP has used a TXOP in the past T ms. If the requesting AP has used a TXOP in the past T ms, then method 400 may proceed to stage 425 where the sharing AP may contend for medium access based on its own traffic and, if the sharing AP wins the contention, it does not share a TXOP with the requesting AP. Continuing the above example, where the value of T is 20 ms for application 155, if a decision is made that first AP 110 used a TXOP 10 ms ago to service application 155, application 155 does not currently need to be serviced again and thus it would be waste of TXOP sharing. Therefore, second AP 115 may proceed to contend for medium access using EDCA parameters associated with its own traffic and if second AP 115 wins contention, second AP 115 does not share a TXOP with first AP 110.

Method 400 may then proceed to stage 430, where a decision is made as to whether a notification has been received indicating that requesting AP is no longer requesting TXOP sharing (e.g., an end of TXOP request notification). If the notification has been received, method 400 may then end at stage 435. If the notification has not been received, method 400 may return to stage 415.

Alternatively, if a decision is made at stage 420 that the requesting AP has not used a TXOP in the past T ms, then method 400 may proceed to stage 440 where EDCA parameters for the sharing AP may be modified according to the high priority application. For example, EDCA parameters for second AP 115 may be modified to reflect the high priority data traffic AC associated with application 155. This modification enables second AP 115 to contend more aggressively than it otherwise would based on its pre-modified EDCA parameters (particularly if second AP 115 is associated with low priority traffic). More aggressive contention by second AP 115 increases probability that either first AP 110 or second AP 115 will win contention over other APs or clients in network 100, which ensures that application 155 executing on client 125 will be timely serviced. For example, if first AP 110 wins contention, first AP 110 can gain access to the medium and service client 125 or, if second AP 115 wins, second AP 115 can share a TXOP with first AP 110 on the medium and first AP 110 may use this TXOP to service application 155.

Once the EDCA parameters for the sharing AP are modified at stage 440, method 400 may proceed to stage 445 where sharing AP may contend for the channel using the modified EDCA parameters and reserve (e.g., pre-allocate) TXOP based on its own traffic as well as requested TXOP resources to enable TXOP sharing with the requesting AP without compromising the sharing AP's own needs to service its own clients, for example. As discussed above, the sharing AP may contend more aggressively as a result of the modified EDCA parameters. The requested TXOP resources may be determined or obtained from the information associated with the high priority application received along with the TXOP share request. This information may be leveraged to reserve or pre-allocate an appropriate TXOP duration for the requesting AP should the sharing AP win contention and share a TXOP with requesting AP. The appropriate TXOP duration may allow requesting AP sufficient air time on the medium to service the high priority application using the shared TXOP from sharing AP. Sharing AP may reserve the TXOP by sending a Request to Send (RTS)/Clear to Send (CTS) corresponding to the TXOP duration.

Following stage 445, method 400 may then proceed to stage 430, where a decision is made as to whether an end of TXOP request notification has been received. If the notification has been received, method 400 may then end at stage 435. If the notification has not been received, method 400 may return to stage 415.

Figure 5:
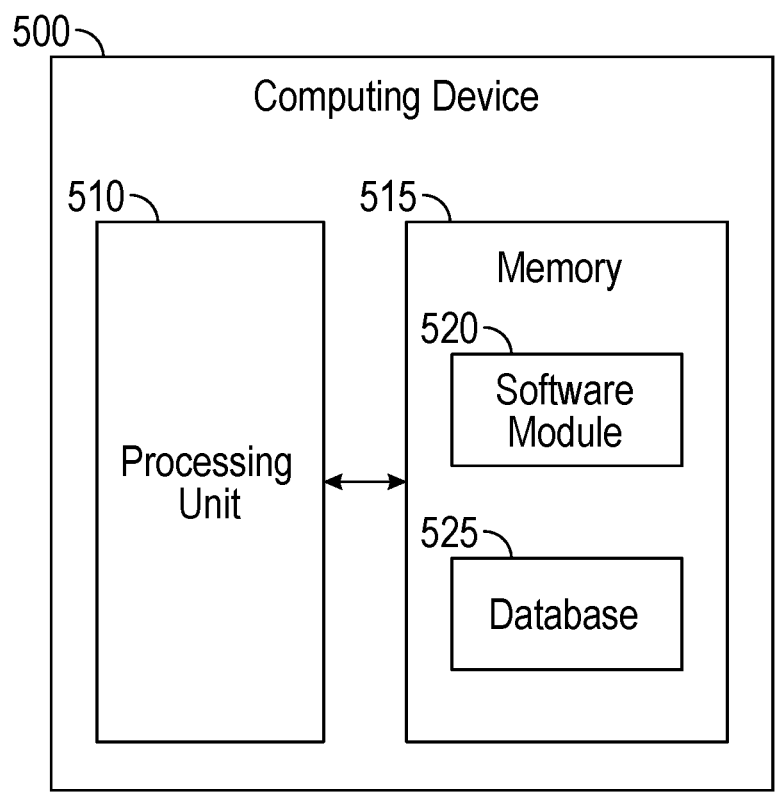
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for application-based TXOP sharing as described above with respect to FIG. 2, FIG. 3, and FIG. 4. Computing device 500, for example, may provide an operating environment for controller 105, first AP 110, second AP 115, third AP 120, network management system 130, and sniffer 135. Controller 105, first AP 110, second AP 115, third AP 120, network management system 130, and sniffer 135 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with respect to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a sharing Access Point (AP) prior to contending for medium access, an announcement shared across neighboring APs, the announcement comprising a request to share one or more Transmission Opportunities (TXOPs) with a requesting AP when the sharing AP wins contention for TXOPs, the request comprising an indication that the requesting AP is in need of additional TXOP for an application executing on a client serviced by the requesting AP and information comprising a traffic Access Category (AC) associated with the application;
   reserving, by the sharing AP, a TXOP duration for the requesting AP based on the information associated with the application received from the requesting AP, wherein reserving the TXOP duration for the requesting AP comprises:
   modifying Enhanced Distributed Channel Access (EDCA) parameters for the sharing AP to add EDCA parameters assigned to the traffic AC obtained from the information associated with the application, and contending for the medium access based on the modified EDCA parameters; and
   subsequent to gaining the medium access, sharing, by the sharing AP, a TXOP with the requesting AP for the TXOP duration.

2. The method of claim 1, wherein the information associated with the application further includes at least one of: a traffic load, a traffic periodicity, or a latency sensitivity associated with the application.

3. The method of claim 2, wherein reserving the TXOP duration for the requesting AP based on the information associated with the application comprises reserving the TXOP duration based on at least the traffic load.

4. The method of claim 1, further comprising:
   computing a time period value; and
   determining that the requesting AP has not used a TXOP within at least a time period equal to the time period value.

5. The method of claim 4, wherein the time period value is one of:
   a traffic periodicity of the application obtained from the information associated with the application; or
   a random value selected based on EDCA rules associated with traffic of the application.

6. The method of claim 1, further comprising:
   receiving a notification that indicates an end of the request to share the TXOPs with the requesting AP.

7. The method of claim 1, wherein the sharing AP is one of a subset of neighbor APs included in a TXOP sharing candidate list for the client that receives the request, the subset of neighbor APs including neighbor APs to the requesting AP that are determined to be within a predefined proximity to the client.

8. An apparatus comprising:
   a memory storage; and
   a processing unit coupled to the memory storage, wherein the processing unit is operative to:
   receive an announcement shared across neighboring Access Points (APs) prior to contending for medium access, the announcement comprising a request to share one or more Transmission Opportunities (TXOPs) with a requesting Access Point (AP) when the sharing AP wins contention for the TXOPs, the request comprising an indication that the requesting AP is in need of additional TXOPs for an application executing on a client serviced by the requesting AP and information comprising a traffic Access Category (AC) associated with the application;
   reserve a TXOP duration for the requesting AP based on the information associated with the application received from the requesting AP, wherein the processing unit being operative to reserve the TXOP duration for the requesting AP comprises the processing unit being operative to:
   modify Enhanced Distributed Channel Access (EDCA) parameters for the sharing AP to add EDCA parameters assigned to the traffic AC obtained from the information associated with the application, and
   contend for the medium access based on the modified EDCA parameters; and
   subsequent to gaining the medium access, share a TXOP with the requesting AP for the TXOP duration.

9. The apparatus of claim 8, wherein the information associated with the application includes traffic load, and wherein the TXOP duration for the requesting AP is reserved based on at least the traffic load.

10. The apparatus of claim 8, wherein the information associated with the application includes traffic periodicity, and wherein the processing unit is further operative to determine that the requesting AP has not used a TXOP within at least a time period equal to the traffic periodicity.

11. The apparatus of claim 8, wherein the request is received from at least one of the requesting AP and a network management system in response to a detection of the application by at least one of the requesting AP or the network management system.

12. The apparatus of claim 8, wherein the processing unit is further operative to:
   receive a notification that indicates an end of the request to share the one or more TXOPs with the requesting AP.

13. The apparatus of claim 8, wherein the sharing AP is one of a subset of neighbor APs included in a TXOP sharing candidate list for the client that receives the request, the subset of neighbor APs including neighbor APs to the requesting AP that are determined to be within a predefined proximity to the client.

14. A method comprising:
    detecting, by a requesting Access Point (AP), an application executing on a client serviced by the requesting AP;
    transmitting, to at least one sharing AP prior to contending for medium access, a request to share one or more Transmission Opportunities (TXOPs) with the requesting AP when the sharing AP wins contention for TXOPs, the request comprising an indication that the requesting AP is in need of additional TXOPs for the application and information comprising a traffic Access Category (AC) associated with the application;
    subsequent to the at least one sharing AP gaining the medium access, receiving a TXOP shared from the at least one sharing AP, wherein a duration for the TXOPs is reserved for the requesting AP based on the information comprising a traffic Access Category (AC) associated with the application received from the requesting AP, wherein the at least one sharing AP gains the medium access by:
        modifying Enhanced Distributed Channel Access (EDCA) parameters for the sharing AP to add EDCA parameters assigned to the traffic AC obtained from the information associated with the application, and
        contending for the medium access based on the modified EDCA parameters; and
    using the TXOP to service the client for the duration.

15. The method of claim 14, further comprising:
    determining a plurality of neighbor APs to the requesting AP, the plurality of neighbor APs including the at least one sharing AP; and
    determining whether proximity information of the plurality of neighbor APs to the client is available.

16. The method of claim 15, further comprising:
    in response to determining the proximity information of the plurality of neighbor APs to the requesting AP is available:
        identifying a subset of the plurality of neighbor APs within a predefined proximity of the client; and
        transmitting the request to the subset of the plurality of neighbor APs, the subset including the at least one sharing AP.

17. The method of claim 16, further comprising:
    including the subset of the plurality of neighbor APs in a TXOP sharing candidate list; and
    dynamically updating the TXOP sharing candidate list per TXOP or per traffic periodicity for the application.

18. The method of claim 15, further comprising:
    in response to determining the proximity information of the plurality of neighbor APs to the requesting AP is not available:
        transmitting the request to each of the plurality of neighbor APs;
        initially including each of the plurality of neighbor APs in a TXOP sharing candidate list; and
        removing one or more of the plurality of neighbor APs from the TXOP sharing candidate list in response to a determination that the one or more of the plurality of neighbor APs have a number of shared TXOP failures exceeding a predefined number.

19. The method of claim 15, wherein the proximity information is obtained from at least one of: beacon reports, probe requests, or sniffers.

20. The method of claim 14, further comprising:
    transmitting a notification to the at least one sharing AP indicating that the requesting AP no longer requests TXOP sharing in response to detecting an end of traffic associated with the application.

* * * * *